(12) United States Patent
Park et al.

(10) Patent No.: US 10,742,372 B2
(45) Date of Patent: Aug. 11, 2020

(54) SYMBOL PROCESSING

(71) Applicant: QUALCOMM Incorporated, San Diego, CA (US)

(72) Inventors: Seyong Park, San Diego, CA (US); Jing Lei, San Diego, CA (US); Joseph Binamira Soriaga, San Diego, CA (US); Renqiu Wang, San Diego, CA (US); Naga Bhushan, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/373,113

(22) Filed: Apr. 2, 2019

(65) Prior Publication Data

US 2019/0312691 A1 Oct. 10, 2019

Related U.S. Application Data

(60) Provisional application No. 62/654,272, filed on Apr. 6, 2018.

(51) Int. Cl.
*H04L 5/00* (2006.01)
*H04B 1/7103* (2011.01)

(52) U.S. Cl.
CPC ......... *H04L 5/0016* (2013.01); *H04B 1/7103* (2013.01); *H04L 5/0037* (2013.01); *H04L 5/0042* (2013.01); *H04B 2201/709709* (2013.01)

(58) Field of Classification Search
CPC ... H04L 27/36; H04L 27/2636; H04L 1/0041; H04L 5/0016; H04L 1/0071;

(Continued)

(56) References Cited

U.S. PATENT DOCUMENTS

2016/0119184 A1\* 4/2016 Soriaga ............. H04W 72/1215
370/254
2017/0230138 A1\* 8/2017 Xiong ................... H04L 1/0003
(Continued)

OTHER PUBLICATIONS

Y. Cao, H. Sun, J. Soriaga and T. Ji, "Resource Spread Multiple Access—A Novel Transmission Scheme for 5G Uplink," Sep. 24-27, 2017, 2017 IEEE 86th Vehicular Technology Conference (VTC-Fall), Toronto, ON, pp. 1-5 https://ieeexplore.ieee.org/stamp/stamp.jsp?tp=&arnunnber=8288412.\*

(Continued)

*Primary Examiner* — Maharishi V Khirodhar
*Assistant Examiner* — Kenneth P Hunt
(74) *Attorney, Agent, or Firm* — Harrity & Harrity, LLP

(57) ABSTRACT

Various aspects of the present disclosure generally relate to wireless communication. In some aspects, a user equipment (UE) may determine that a resource spread multiple access scheme is enabled, wherein the bit and/or symbol level resource spreading happens in time and/or frequency domain through bits or symbol level repetition and spreading. Furthermore, the UE may process bits of codewords and modulated symbols using a set of spreading sequences and a set of scrambling sequences. The UE may transmit the modulated symbols with a discrete-Fourier-transform (DFT)-spread (DFT-s) waveform based at least in part on processing the modulated symbols using the set of spreading sequences and the set of scrambling sequences. Numerous other aspects are provided.

50 Claims, 10 Drawing Sheets

(58) Field of Classification Search
CPC .. H04L 5/0037; H04L 5/0042; H04J 13/0003; H04B 1/7103; H04B 2201/709709
See application file for complete search history.

(56) References Cited

U.S. PATENT DOCUMENTS

2018/0054218 A1* 2/2018 Qian ............... H03M 13/27
2019/0260419 A1* 8/2019 Park ............... H04B 1/70735

OTHER PUBLICATIONS

Yang Shan, Chen Peng, Liang Lin, Zhu Jianchi, and She Xiaoming, "Uplink Multiple Access Schemes for 5G: A Survey," Jun. 2017, ZTE Communications, vol. 15 No. S1, https://res-www.zte.com.cn/mediares/magazine/publication/com_en/article/2017S1/464714/P020170724609953993550.pdf.*
Qualcomm, "R1-164688 RSMA," May 23-27, 2016, 3GPP TSG-RAN WG1 #85.*
International Search Report and Written Opinion—PCT/US2019/025570—ISA/EPO—dated Jul. 2, 2019.
NTT Docomo., et al., "Discussion on Performance Comparison for NOMA", 3GPP Draft; R1-1802500, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 16, 2018, (Feb. 16, 2018), pp. 1-9, XP051397297, Retrieved from the Internet: URL: http://www.3gpp.org/ftp/tsg_ran/WG1_RL1/TSGR1_92/Docs/ [retrieved on Feb. 16, 2018], Section 3.
Qualcomm Incorporated: "Transmitter Side Signal Processing Schemes for NOMA", 3GPP Draft; R1-1802856 Transmitter Side Signal Processing Schemes for NOMA, 3rd Generation Partnership Project (3GPP), Mobile Competence Centre, 650, Route Des , Lucioles, F-06921 Sophia-Antipolis Ced, vol. RAN WG1, No. Athens, Greece; Feb. 26, 2018-Mar. 2, 2018, Feb. 17, 2018 (Feb. 17, 2018), XP051398269, 9 Pages, Retrieved from the Internet: URL: http://www.3gpp.org/ftp/tsg_ran/WG1_RL1/TSGR1_92/Docs/ [retrieved on Feb. 17, 2018], Sections 2 and 3 p. 2.
Qualcomm Incorporated: "Transmitter Side Signal Processing Schemes for NOMA", 3GPP Draft, R1-1813405 Transmitter Side Signal Processing Schemes for NOMA, 3rd Generation Partnership Project (3GPP), Mobile Competence Centre, 650, Route Des Lucioles, F-06921 Sophia-Antipolis CEO, vol. RAN WG1, No. Spokane, USA, Nov. 12, 2018-Nov. 16, 2018, Nov. 11, 2018 (Nov. 11, 2018), XP051555444, 14 Pages, Retrieved from the Interrnet: URL:http://www.3gpp.org/ftp/TSG_RAN/WG1_RL1/TSGR1_95/Docs/R1-1813405.zip [retrieved on Nov. 11, 2018].
Wu Z., et al., "Comprehensive Study and Comparison on 5G NOMA Schemes", IEEE Access, vol. 6, Mar. 19, 2018 (Mar. 19, 2018), pp. 18511-18519, XP055597076, DOI: 10.1109/ACCESS.2018.2817221, Section II.A.

* cited by examiner

SYMBOL PROCESSING

This application claims priority to U.S. Provisional Patent Application No. 62/654,272, filed on Apr. 6, 2018, entitled "TECHNIQUES AND APPARATUSES FOR SYMBOL PROCESSING," which is hereby expressly incorporated by reference herein.

FIELD OF THE DISCLOSURE

Aspects of the present disclosure generally relate to wireless communication, and more particularly to techniques and apparatuses for symbol processing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a resource spread multiple access (RSMA) scheme is enabled; processing bits of codewords and modulated symbols using a set of spreading sequences and a set of scrambling sequences, wherein the processing includes performing at least one of bit level resource spreading or symbol level resource spreading in at least one of a time domain or a frequency domain and using low rate channel coding and symbol level spreading, and wherein the processing includes repeating the bits of codewords to generate repeated bits, interleaving the repeated bits, and demultiplexing the repeated and interleaved bits into a plurality of processing layers for further processing; and transmitting the modulated symbols with a discrete-Fourier-transform (DFT)-spread (DFT-s) waveform based at least in part on processing the modulated symbols using the set of spreading sequences and the set of scrambling sequences.

In some aspects, a UE for wireless communication may include memory and one or more processors operatively coupled to the memory. The memory and the one or more processors may be configured to determine that a resource spread multiple access scheme is enabled; process bits of codewords and modulated symbols using a set of spreading sequences and a set of scrambling sequences, wherein the processing includes performing at least one of bit level resource spreading or symbol level resource spreading in at least one of a time domain or a frequency domain and using low rate channel coding and symbol level spreading, and wherein the processing includes repeating the bits of codewords to generate repeated bits, interleaving the repeated bits, and demultiplexing the repeated and interleaved bits into a plurality of processing layers for further processing; and transmit the modulated symbols with a discrete-Fourier-transform (DFT)-spread (DFT-s) waveform based at least in part on processing the modulated symbols using the set of spreading sequences and the set of scrambling sequences.

In some aspects, a non-transitory computer-readable medium may store one or more instructions for wireless communication. The one or more instructions, when executed by one or more processors of a UE, may cause the one or more processors to: determine that a resource spread multiple access scheme is enabled; process bits of codewords and modulated symbols using a set of spreading sequences and a set of scrambling sequences, wherein the processing includes performing at least one of bit level resource spreading or symbol level resource spreading in at least one of a time domain or a frequency domain and using low rate channel coding and symbol level spreading, and wherein the processing includes repeating the bits of codewords to generate repeated bits, interleaving the repeated bits, and demultiplexing the repeated and interleaved bits into a plurality of processing layers for further processing; and transmit the modulated symbols with a discrete-Fourier-transform (DFT)-spread (DFT-s) waveform based at least in part on processing the modulated symbols using the set of spreading sequences and the set of scrambling sequences.

In some aspects, an apparatus for wireless communication may include means for determining that a resource spread multiple access scheme is enabled; means for processing bits of codewords and modulated symbols using a set of spreading sequences and a set of scrambling sequences, wherein the processing includes performing at least one of bit level resource spreading or symbol level resource spreading in at least one of a time domain or a frequency domain and using low rate channel coding and symbol level spreading, and wherein the processing includes repeating the bits of codewords to generate repeated bits, interleaving the repeated bits, and demultiplexing the repeated and interleaved bits into a plurality of processing layers for further processing; and means for transmitting the modulated symbols with a discrete-Fourier-transform (DFT)-spread (DFT-s) waveform based at least in part on processing the modulated symbols using the set of spreading sequences and the set of scrambling sequences.

Aspects generally include a method, apparatus, device, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
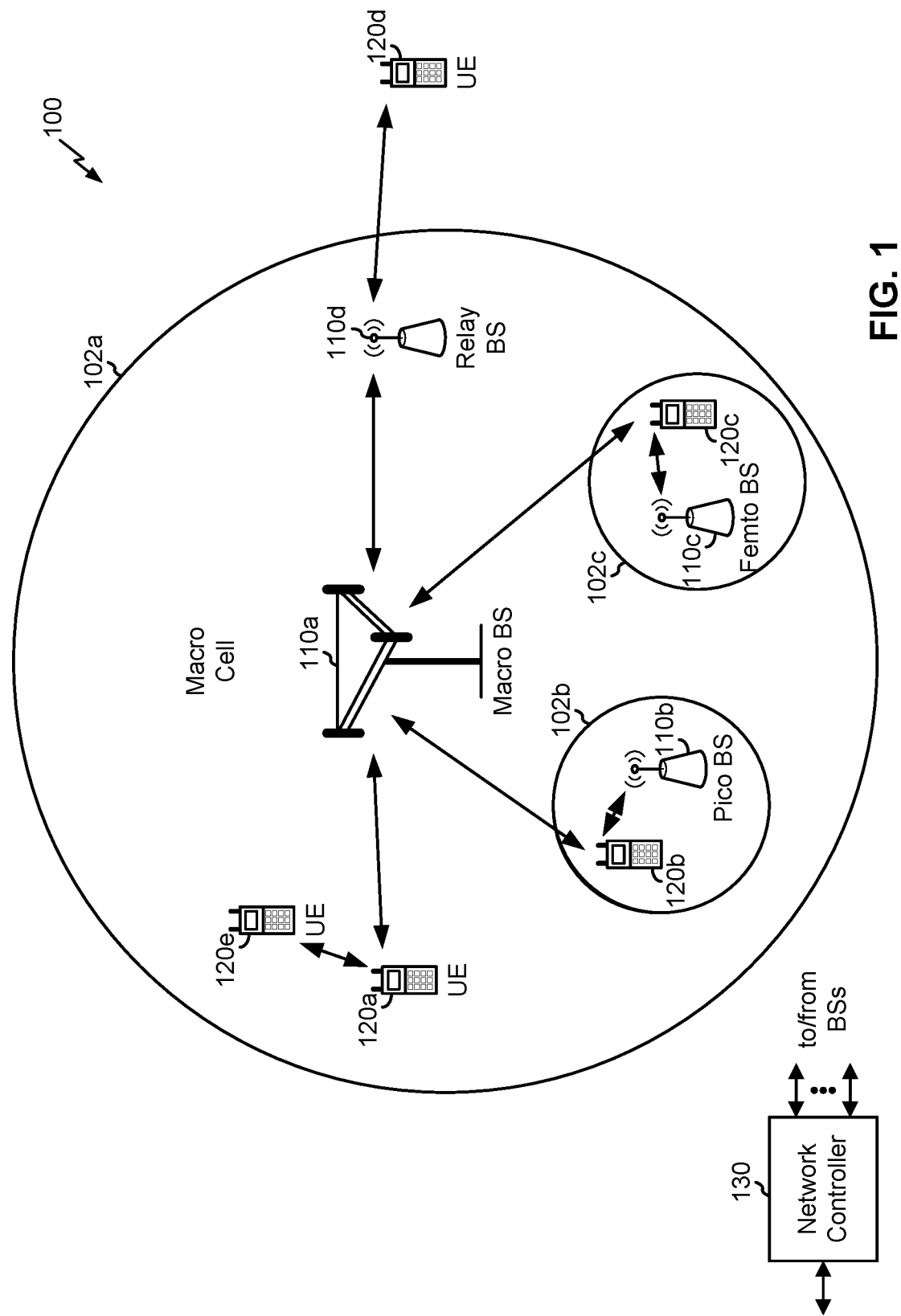
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
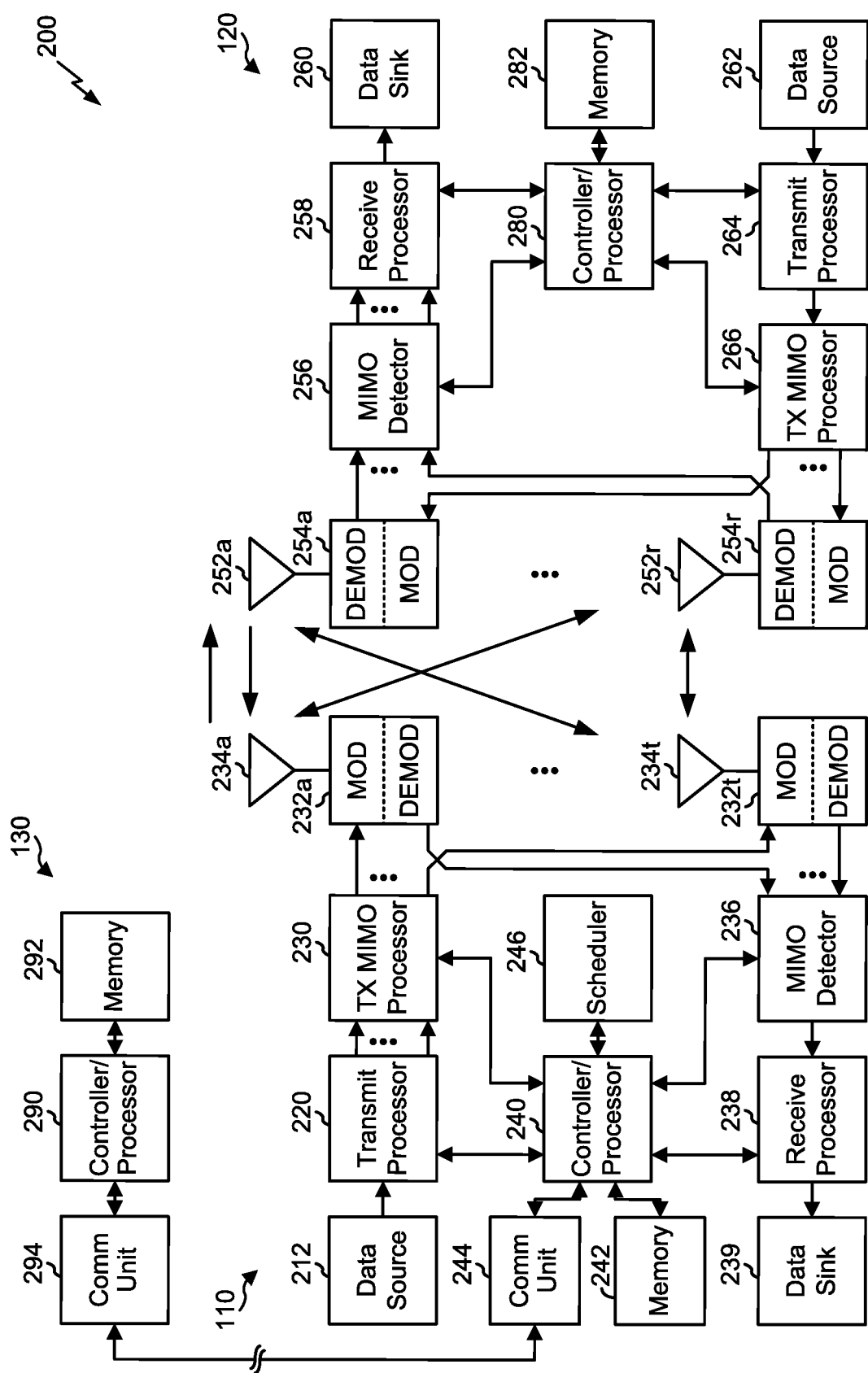
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with symbol processing, as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that a non-orthogonal multiple access scheme is enabled; means for processing bits of codewords and modulated symbols using a set of spreading sequences and a set of scrambling sequences, wherein the processing includes repeating the bits of codewords to generate repeated bits, interleaving the repeated bits, and demultiplexing the repeated and interleaved bits into a plurality of processing layers for further processing; means for transmitting the modulated symbols based at least in part on processing the modulated symbols using the set of spreading sequences and the set of scrambling sequences; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
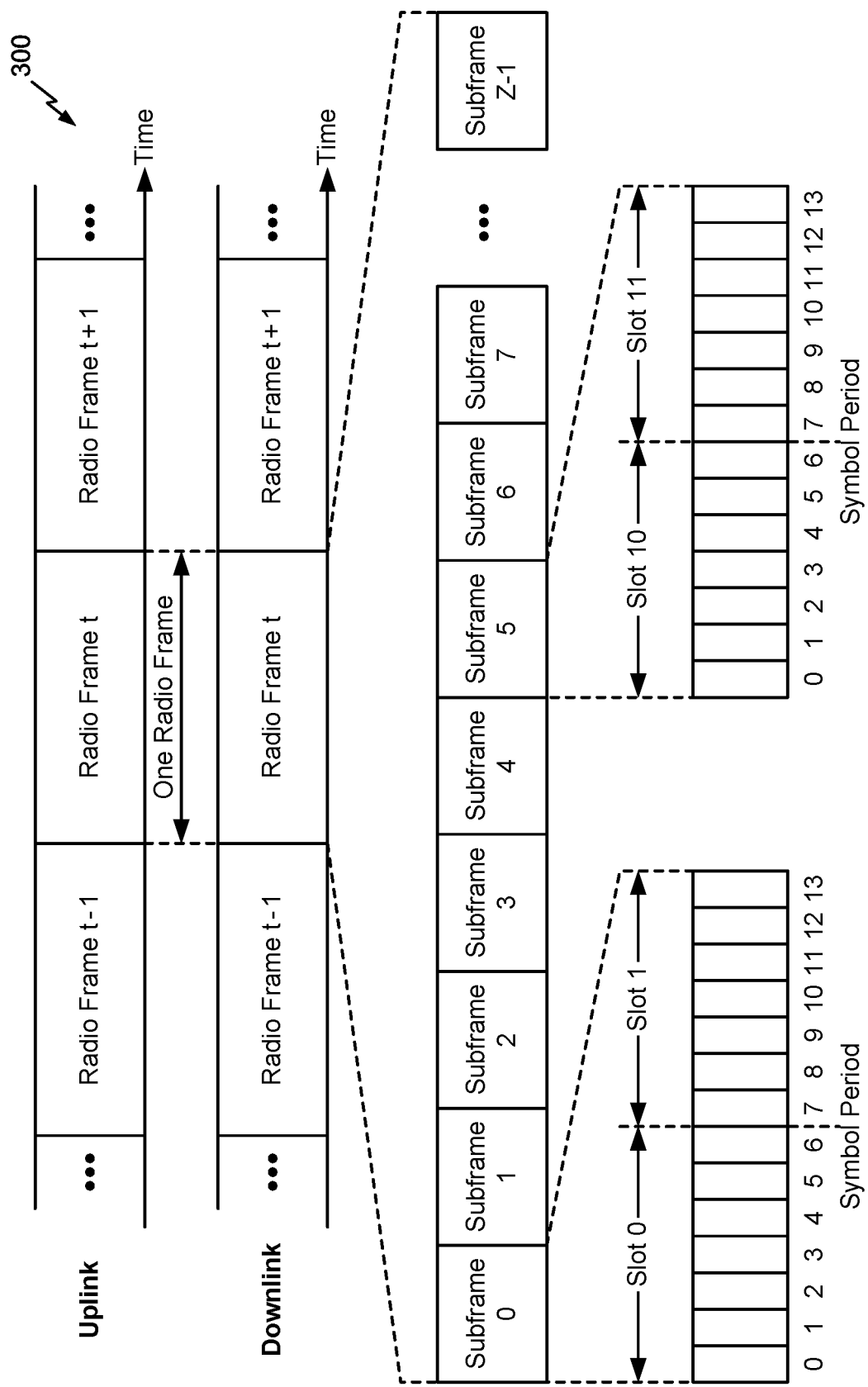
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
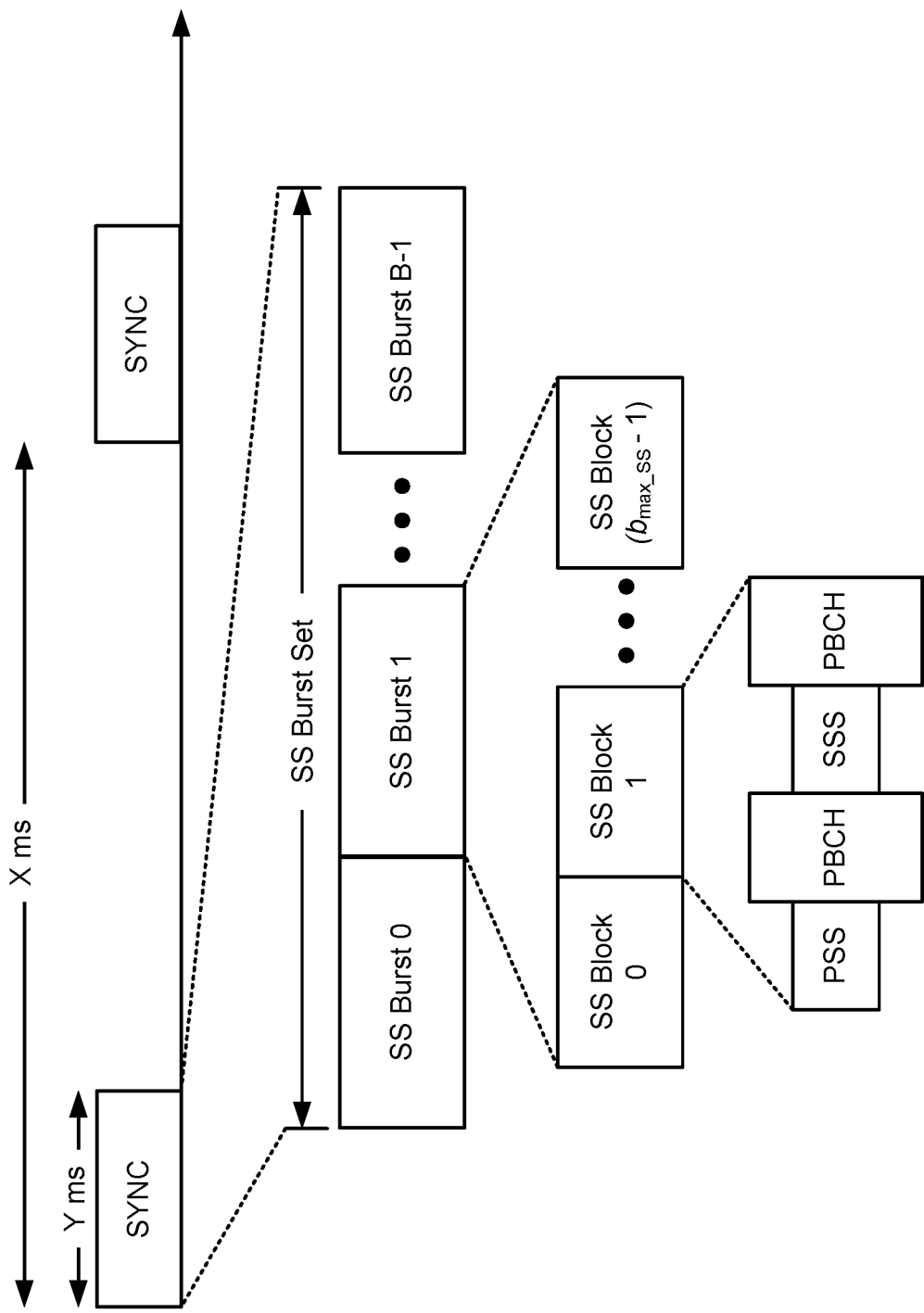
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
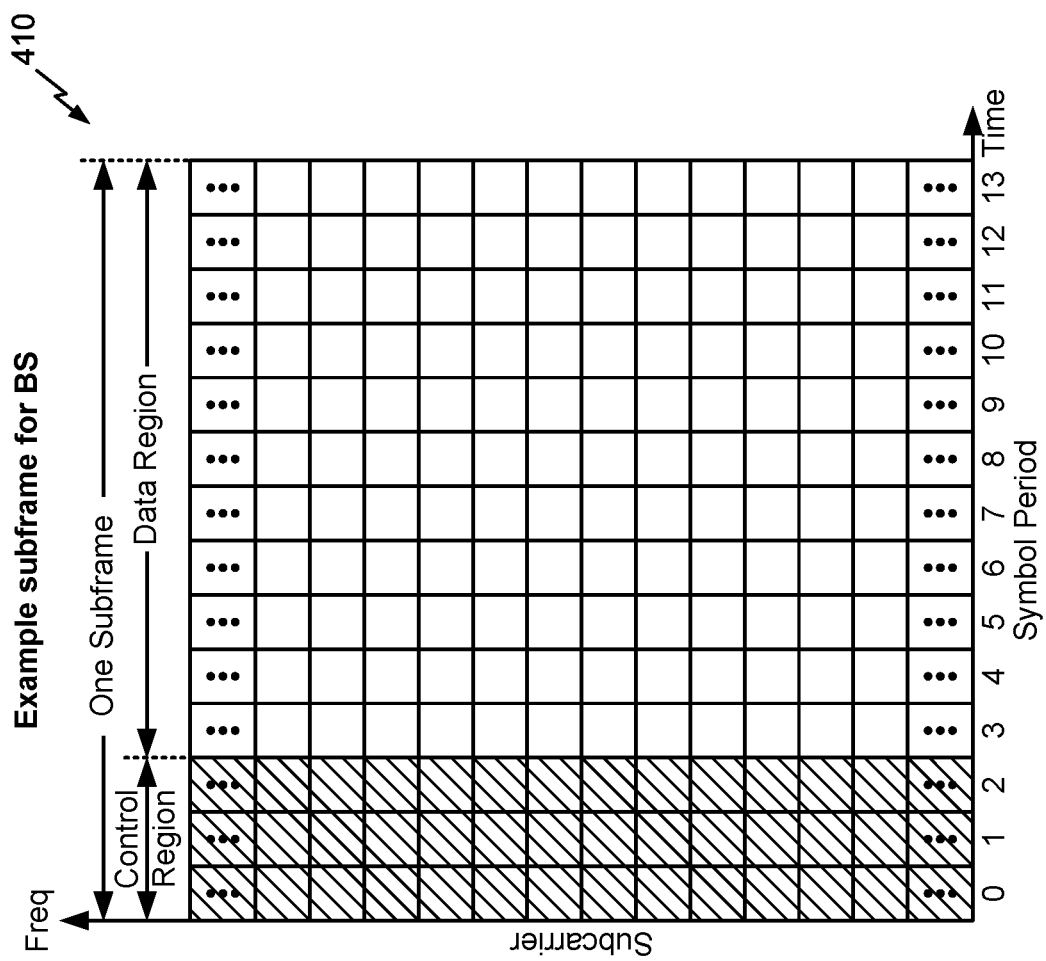
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
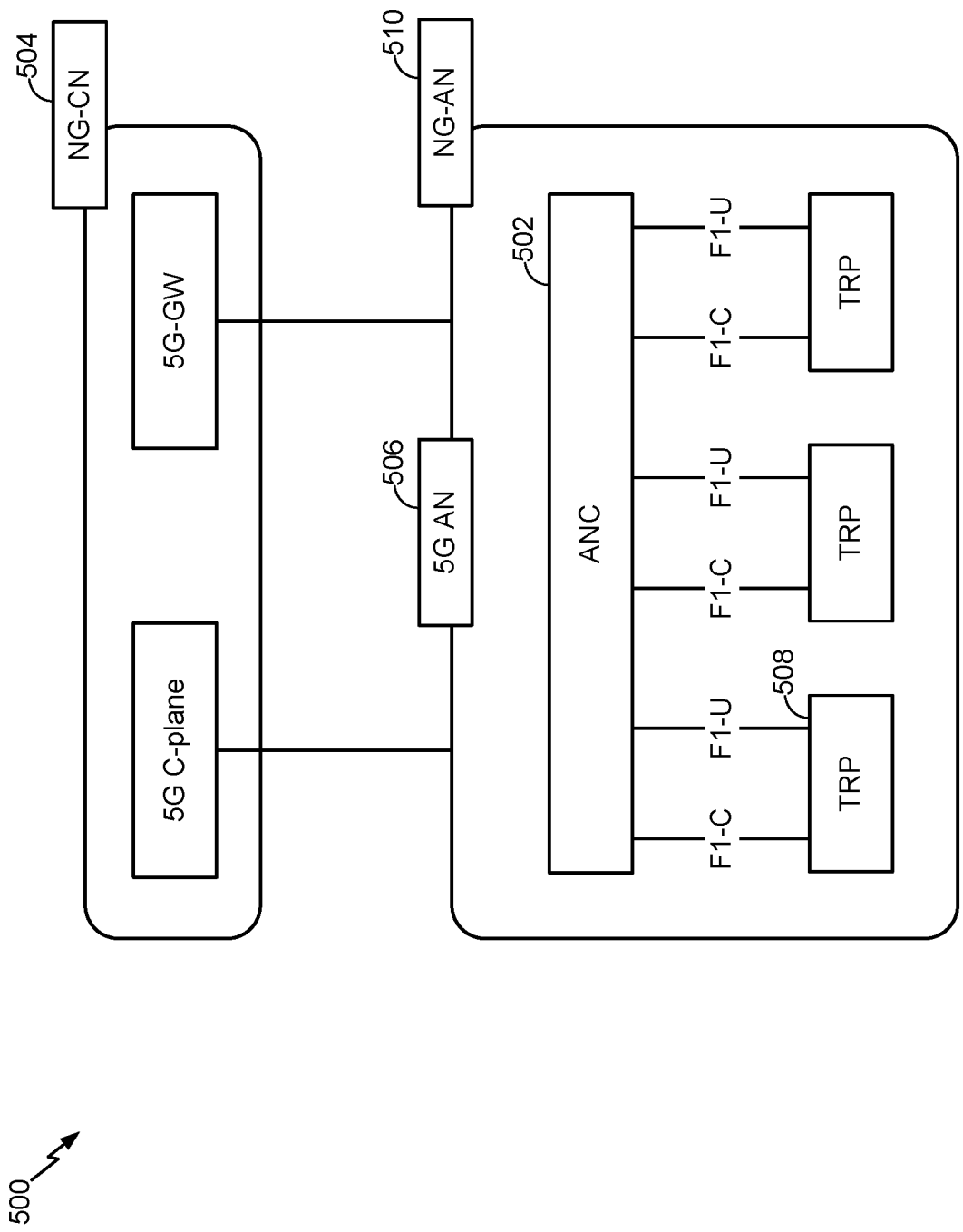
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
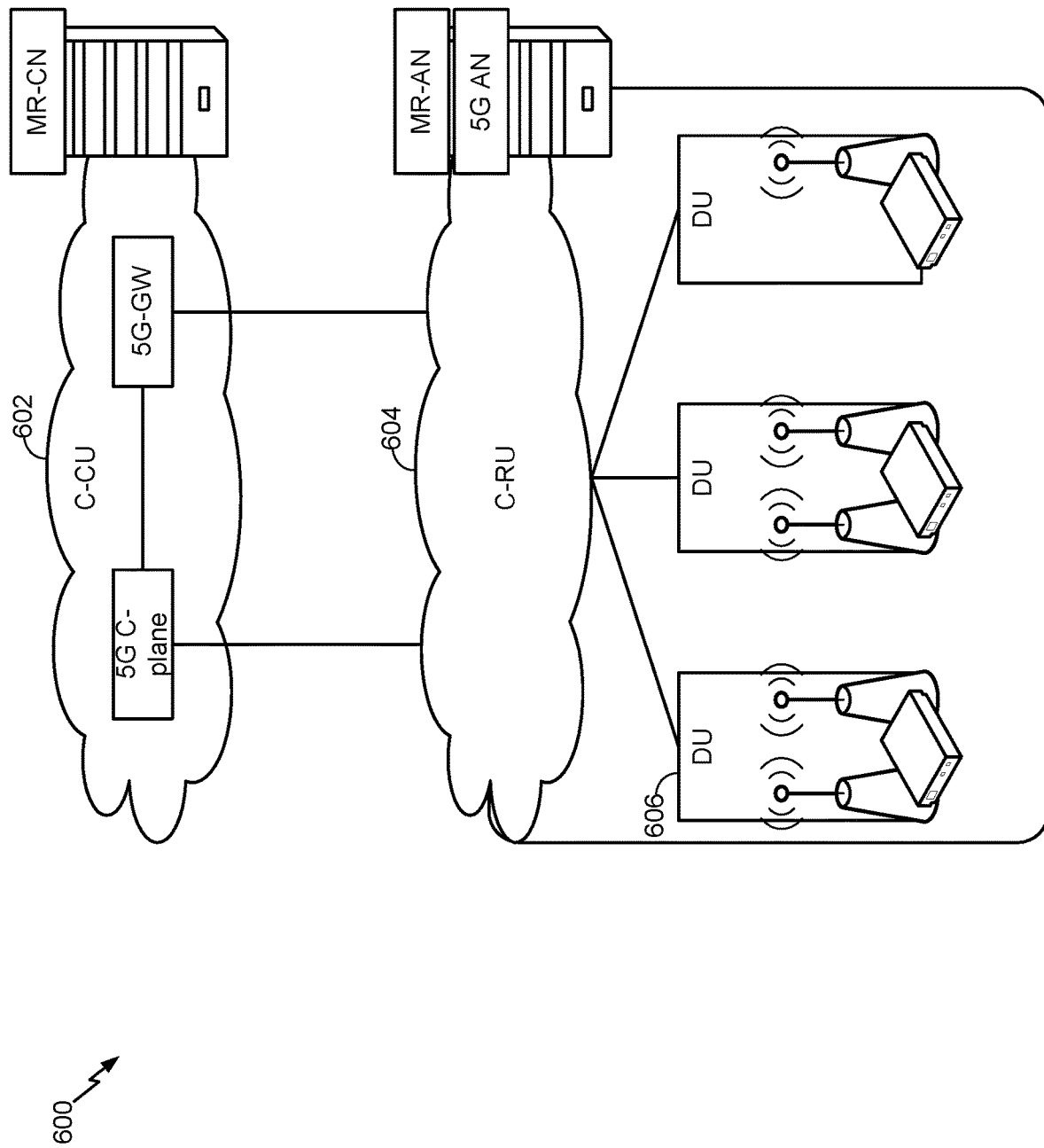
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

A UE may modulate and process data to enable transmission of the data. For example, the UE may segment data into transport blocks for transport, encode the data, scramble the data, modulate the data, and/or the like. In resource spread multiple access (RSMA) using non-orthogonal multiple access (NOMA) based communication, the UE may apply a relatively low-rate channel coding scheme (e.g., less than a threshold rate, such as BPSK, QPSK, and/or the like) and may apply UE specific scrambling to data. In this way, a network may enable grant-free transmission, asynchronous multiple access, and/or the like. Moreover, use of RSMA using NOMA may enable a plurality of UEs to share a common set of network resources.

In a NOMA-based processing scheme, the UE may apply, after modulating a set of symbols, spreading to the set of symbols (e.g., to transform each symbol into a particular quantity of chips based at least in part on a spreading factor) and scrambling to the set of symbols (e.g., to scramble the set of chips to enable demodulation of the set of chips by a BS). The UE may apply the spreading and the scrambling based at least in part on short spreading code codebook sequences and long scrambling sequences, respectively. A short code sequence may be UE specific for each UE and associated with a particular length and a long sequence may be BS specific for each group of UEs using a particular BS and may be associated with a different length that is longer than the particular length. However, when using some low-coding rate modulation schemes, such as $\pi/2$ BPSK, $\pi/4$ QPSK, and/or the like, applying the set of sequences may not preserve the modulation scheme that was applied to the set of symbols, thereby preventing successful transmission, reception, and decoding of data of the set of symbols. Moreover, as a result of, for example, interference in the UE communication with the BS, bits and/or symbols may be dropped during transmission from the UE to the BS in non-orthogonal multiple access schemes.

Some aspects, described herein, may enable symbol processing to preserve modulation applied to a set of symbols, such as for RSMA using NOMA. For example, a UE may determine that the UE is to modulate a set of symbols using a particular modulation scheme, and may select a set of sequences, which preserve the particular modulation scheme, for processing the set of symbols. In this case, the UE may process the set of symbols using the set of sequences, and may transmit the set of symbols based at least in part on processing the set of symbols. Moreover, the UE may repeat codeword bits and interleave the bits to reduce a likelihood that a transmission is unsuccessful as a result of lost bits and/or symbols. Furthermore, the UE may demultiplex bits for processing using a plurality of processing layers, and may perform layer-specific interleaving to reduce a likelihood that a transmission is unsuccessful as a result of lost bits and/or symbols. Furthermore, the UE may apply a particular tone mapping scheme to symbols being transmitted to ensure a threshold level of network performance in communicating with the BS. In this way, the UE enables use of particular modulation schemes, such as for RSMA using NOMA and/or the like, thereby improving network performance, UE power utilization, UE processing utilization, and/or the like.

Figure 7:
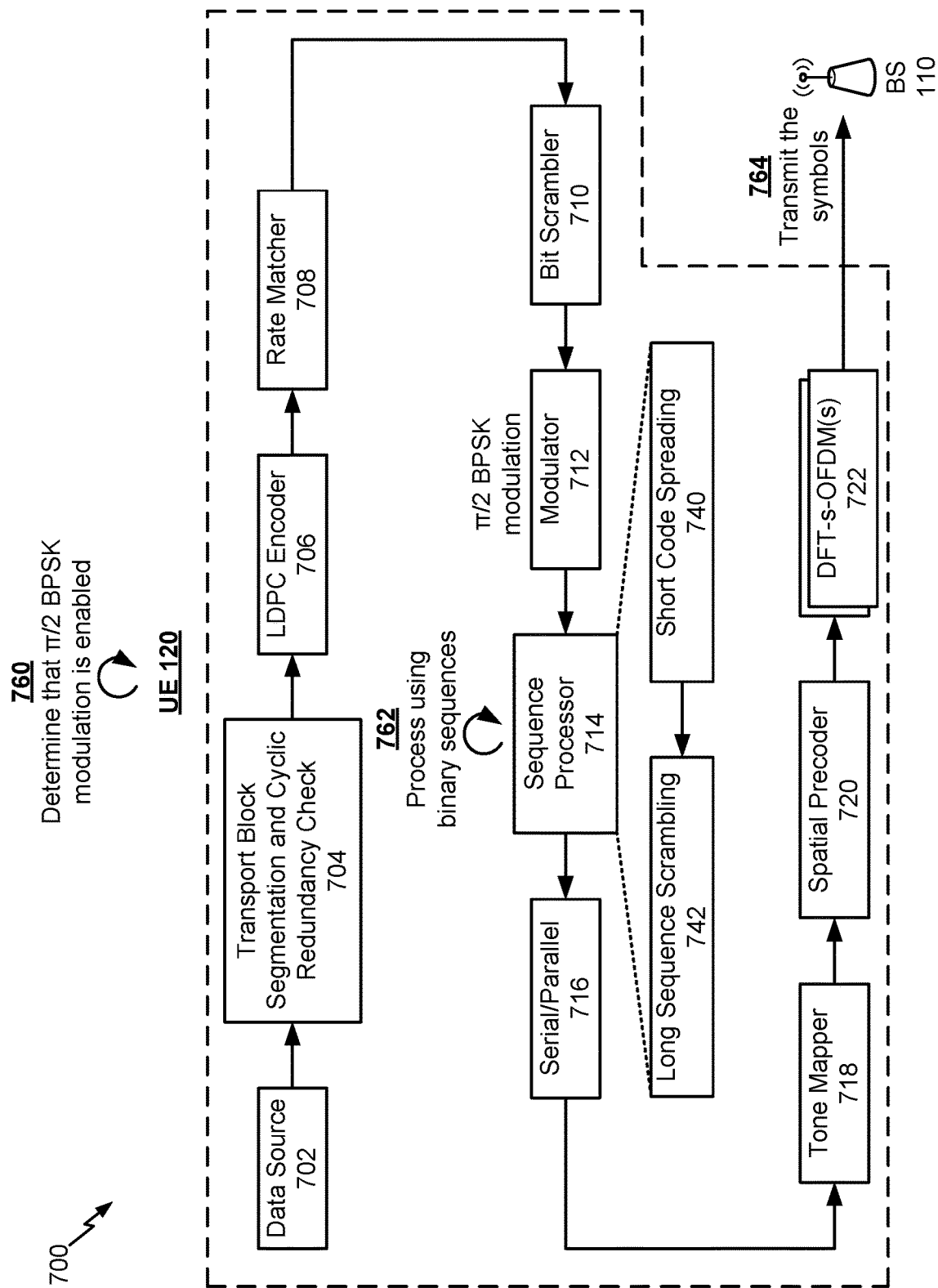
FIG. 7 is a diagram illustrating an example of symbol processing, in accordance with various aspects of the present disclosure.

FIG. 7 is a diagram illustrating an example 700 of symbol processing, in accordance with various aspects of the present disclosure. As shown in FIG. 7, example 700 may include a BS 110 and a UE 120.

As further shown in FIG. 7, UE 120 may include a plurality of components for RSMA using NOMA based symbol processing. For example, UE 120 includes a data source component 702 to provide data; a transport block segmentation and cyclic redundancy check component 704 to perform transport block segmentation and a cyclic redundancy check; a low density parity check (LDPC) encoder component 706 to perform LDPC encoding; a rate matcher component 708 to perform rate matching; a bit scrambler component 710 to perform bit scrambling; a modulator component 712 to perform symbol modulation; a sequence processor component 714 to process symbols using a set of sequences; a serial/parallel component 716 to perform serial-to-parallel conversion; a tone mapper component 718 to perform tone mapping; a spatial precoder component 720 to perform precoding; a set of DFT-s-OFDM component(s) 722 to multiplex a waveform; and/or the like. In some aspects, sequence processor component 714 may include a short code spreading component 740 to perform short code based spreading and a long sequence scrambling component 742 to perform long sequence based scrambling. Although some aspects, described herein, are described in terms of a particular set of components, other components are possible, such as phase rotation components and/or the like.

As further shown in FIG. 7, and by reference number 760, UE 120 may determine that a particular modulation scheme is enabled for UE 120. For example, UE 120 may determine that $\pi/2$ BPSK modulation is enabled for UE 120 (e.g., for modulator component 712). Additionally, or alternatively, UE 120 may determine that $\pi/4$ QPSK is enabled for UE 120. In some aspects, UE 120 may determine that the particular modulation scheme is enabled based at least in part on received signaling. For example, BS 110 may provide a grant to indicate that UE 120 is to use $\pi/2$ BPSK. Additionally, or alternatively, UE 120 may determine the particular modulation scheme without receiving a grant. For example, when operating in a massive machine type communications (mMTC) scenario, UE 120 may perform a downlink measurement, and may select $\pi/2$ BPSK as the modulation scheme based at least in part on the downlink measurement.

In some aspects, UE 120 may select a set of sequences based at least in part on the particular modulation scheme. For example, UE 120 may select a particular short code codebook for $\pi/2$ BPSK that preserves $\pi/2$ BPSK modulation for the set of symbols. In this case, the particular short code codebook may only include binary sequences rather than, for example, a short code codebook that includes both binary sequences and non-binary (e.g., QPSK sequences). For example, the particular short code codebook may use Hadamard code based sequences. Similarly for $\pi/4$ QPSK, UE 120 may select a particular short code codebook that only includes sequences that preserve QPSK (e.g., a set of non-binary sequences, such as QPSK sequences and/or the like).

Additionally, or alternatively, UE 120 may select a particular set of long sequences for long sequence scrambling. In this case, the particular set of long sequences may only include binary sequences. For example, the particular set of long sequences may be binary Gold sequences. In some aspects, the particular set of long sequences may use a $\pi/2$ BPSK structure (rather than a BPSK binary sequence). For example, UE 120 may determine to use a $\pi/2$ BPSK structure for the particular set of long sequences to preserve a BSPK modulation scheme applied to the symbols.

In some aspects, UE 120 may select a subset of a set of sequences for use based at least in part on the particular modulation scheme. For example, UE 120 may select a subset of codes of a particular short code codebook (which may be termed a degenerated codebook) for $\pi/2$ BPSK that preserves $\pi/2$ BPSK modulation for the set of symbols. In this case, the degenerated codebook may include a first threshold quantity of sequences of the particular short code codebook that are binary sequences or are within a threshold amount of being binary sequences, and may not include other sequences of the particular short code codebook that are not binary sequences. Additionally, or alternatively, UE 120 may select a particular subset of a set of long sequences. For example, UE 120 may select, from a set of long sequences that includes both binary sequences and non-binary sequences (e.g., QPSK sequences), a subset of long sequences that are binary sequences. In some aspects, for $\pi/4$ QPSK, UE 120 may select a subset of a set of long sequences, which includes both binary sequences and non-binary sequences, that preserve $\pi/4$ QPSK modulation (e.g., the non-binary sequences).

In some aspects, UE 120 may select the particular short code codebook that only includes binary sequences and the particular set of long sequences that only includes binary sequences. For example, UE 120 may store a plurality of short code codebooks and a plurality of sets of long sequences, and may select a particular short code codebook for $\pi/2$ BPSK and a particular set of long sequences for $\pi/2$ BPSK. In some aspects, UE 120 may select both the degenerated codebook and the subset of the set of long sequences. For example, UE 120 may store a single short code codebook and a single set of long sequences, and may select a subset of the single short code codebook and the single set of long sequences (e.g., based at least in part on stored selection information). In some aspects, UE 120 may select a particular short code codebook that only includes binary sequences, and may select a subset of the single set of long sequences. In some aspects, UE 120 may select the degenerated codebook from the single short code codebook, and may select the particular set of long sequences that only includes binary sequences. In this way, UE 120 uses a particular set of sequences to preserve the particular modulation scheme.

In some aspects, UE 120 may determine to process the symbols using a phase rotation sequence. For example, for a spreading factor of two repetitions for symbol spreading and a short code sequence of, for example, +/−1, +/−1, +/−j, +/−j, +/−1, +/−1, . . . , UE 120 may apply alternating 0 degree, 90 degree, 90 degree, and 0 degree phase rotations in sequence, thereby preserving the particular modulation scheme. In some aspects, UE 120 may apply the phase rotation using a phase correction component. For example, sequence processor component 714 may include a repetition component and a phase correction component to preprocess symbols before spreading and scrambling using, respectively, short codes and long sequences. In some aspects, UE 120 may apply the phase rotation using a phase rotator after spreading and scrambling. For example, after processing using sequence processor component 714, UE 120 may use a phase rotator (e.g., a π/2 phase rotator) to apply the alternating phase rotations. In this way, UE 120 uses phase rotation to preserve the particular modulation scheme.

As further shown in FIG. 7, and by reference number 762, UE 120 may process symbols using binary sequences. For example, for π/2 BPSK, UE 120 may apply binary short codes of a short code codebook, binary scrambling sequences of a set of long sequences, and/or the like. Additionally, or alternatively, for π/4 QPSK, UE 120 may apply non-binary short codes, non-binary scrambling sequences, and/or the like. In this way, based at least in part on selecting and using the sequences for processing (e.g., the short code codebook and/or a subset of short codes thereof, the set of long sequences and/or a subset of long sequences thereof, and/or the like), UE 120 preserves the particular modulation scheme, thereby enabling successful transmission, reception, and decoding of data included in the set of symbols. In some aspects, UE 120 may apply a phase rotation to the set of symbols to process the set of symbols. For example, UE 120 may phase rotate the symbols before spreading and scrambling, after spreading and scrambling, and/or the like, thereby preserving the particular modulation scheme.

As further shown in FIG. 7, and by reference number 764, UE 120 may transmit the symbols. For example, UE 120 may transmit the symbols to BS 110 based at least in part on processing the symbols. In this case, BS 110 may receive and decode the symbols based at least in part on UE 120 preserving the particular modulation scheme. In this way, UE 120 enables use of π/2 BPSK, π/4 QPSK, and/or the like in an RSMA using NOMA communications system.

As indicated above, FIG. 7 is provided as an example. Other examples may differ from what is described with respect to FIG. 7.

Figure 8:
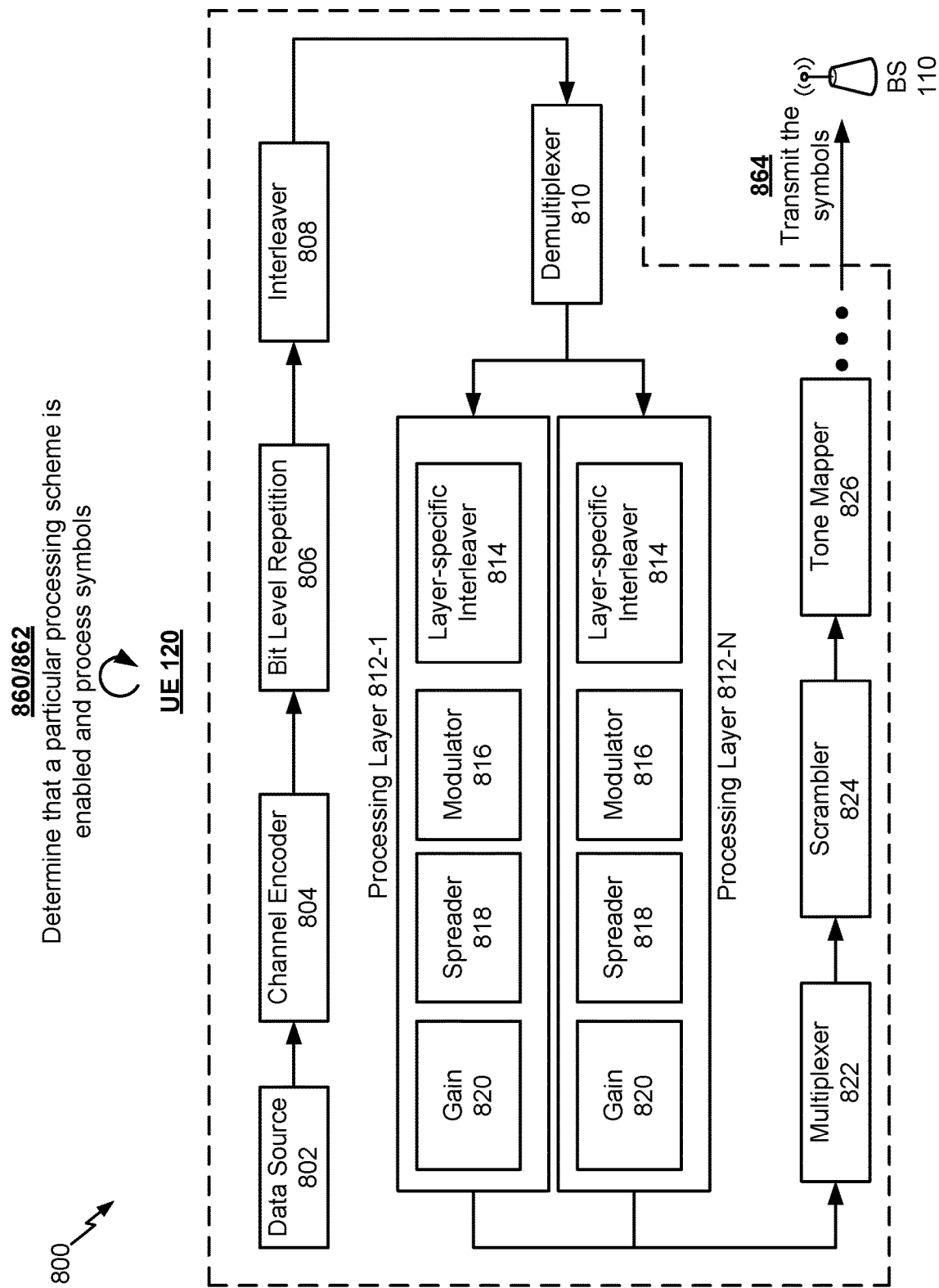
FIG. 8 is a diagram illustrating an example of symbol processing, in accordance with various aspects of the present disclosure.

FIG. 8 is a diagram illustrating an example 800 of symbol processing, in accordance with various aspects of the present disclosure. As shown in FIG. 8, example 800 may include a BS 110 and a UE 120.

As further shown in FIG. 8, UE 120 may include a plurality of components for RSMA using NOMA based symbol processing. For example, UE 120 includes a data source component 802, which may correspond to data source component 702, to provide data; a channel encoder component 804, which may correspond to low density parity check (LDPC) encoder component 706, to perform LDPC encoding; a bit level repetition component 806 to apply bit repetition to codeword bits and generate repeated bits; an interleaver component 808 to interleave the repeated bits; a demultiplexer component 810 to demultiplex the repeated and interleaved bits into a plurality of processing layers 812; the plurality of processing layers 812-1 through 812-N (N>1) to apply a set of processing functions to the repeated and interleaved bits—each processing layer 812 may include a layer-specific interleaver 814 to interleave bits of the processing layer 812, a modulator 816 to modulate bits into symbols, a spreader 818, which may correspond to short code spreading component 740 to perform short code based spreading, and a gain component 820 to apply a gain; a multiplexer component 822 to multiplex the repeated and interleaved bits after the set of processing functions is applied; a scrambler 824, which may correspond to long sequence scrambling component 742, to perform long sequence based scrambling; a tone mapper 826 to perform tone mapping; and/or the like, such as other components described herein with regard to, for example, FIG. 7. Although some aspects, described herein, are described in terms of a particular set of components, other components are possible, such as phase rotation components and/or the like.

As further shown in FIG. 8, and by reference numbers 860 and 862, UE 120 may determine that a particular modulation scheme is enabled for UE 120, and may process bits of codewords and modulated symbols to preserve the particular modulation scheme. For example, UE 120 may determine that a non-orthogonal multiple access scheme, such as π/2 BPSK modulation, π/4 QPSK modulation, and/or the like, is enabled for UE 120, and may select scrambling sequences, short codes, and/or the like based at least in part on the particular modulation scheme enabled for UE 120.

In some aspects, UE 120 may apply bit level repetition. For example, UE 120 may repeat a set of bits [b1, b2, b3, . . . ], such that a set of repeated bits are generated [b1, b1, b1, b1, . . . , b2, b2, b2, b2, . . . , . . . ]. In this way, UE 120 reduces a likelihood that a dropped bit results in communication being interrupted relative to transmitting a single repetition of each bit. In some aspects, UE 120 may apply interleaving to the repeated bits. For example, for the set of repeated bits [b1, b1, b1, b1, . . . , b2, b2, b2, b2, . . . , . . . ], UE 120 may interleave the repeated bits to form [b1, b2, b3, b4, . . . , b1, b2, b3, b4, . . . , . . . ]. In this way, UE 120 reduces a likelihood that a set of consecutive dropped bits results in a communication interruption relative to repeated bits being provided consecutively.

In some aspects, UE 120 may demultiplex bits. For example, UE 120 may demultiplex a set of repeated interleaved bits such that first processing layer 812-1 receives bits [b1, b2, b3, . . . ], . . . , and Nth processing layer 812-N receives bits [b1, b2, b3, . . . ]. In this way, UE 120 enables concurrent modulation and spreading of bits. In some aspects, UE 120 may apply layer-specific interleaving to bits multiplexed to each processing layer. For example, for a set of bits [b1, b2, b3, . . . ] multiplexed to a first processing layer 812-1 and a second processing layer 812-2, UE 120 may apply layer-specific interleaving, such that first processing layer 812-1 forms [b1, b2, b3, b4, b5, b6, b7, b8, . . . ] and a second processing layer 812-2 forms [b3, b4, b1, b2, b7, b8, b5, b6, . . . ]. In this way, UE 120 ensures that, after QPSK modulation into two-bit symbols, first processing layer 812-1 includes a set of symbols [s1, s2, . . . ] and second processing layer 812-2 includes a set of symbols [s2, s1, . . . ]. Based at least in part on altering an order of symbols in each processing layer 812, UE 120 ensures that repetitions of symbols (e.g., repetitions of s1) are not transmitted concurrently or consecutively, thereby reducing a likelihood that a dropped symbol results in a communication interruption.

In some aspects, UE 120 applies spreading to symbols of each processing layer 812 to form spread symbols. For example, UE 120 may spread symbols [s1, s2, . . . ] of first processing layer 812-1 to form [$s_1 c_1^1$, $s_1 c_2^1$, . . . , $s_1 c_x^1$, $s_2 c_1^1$ . . . $s_2 c_x^1$, . . . ] and may spread symbols [s2, s1, . . . ] of second processing layer 812-2 to form [$s_2 c_1^2$, $s_2 c_2^2$, . . . , $s_2 c_x^2$, $s_1 c_1^2$ . . . $s_1 c_x^2$, . . . ], where x represents a quantity of repetitions for spreading. In some aspects, UE 120 may apply a gain factor to spread symbols of a processing layer 812. For example, UE 120 may apply a first gain g1 to first processing layer 812-1 and a second gain g2 to second processing layer 812-2. Based at least in part on applying different gains to symbols of different processing layers, an output of UE 120 is of a 16-QAM form with bit permutation.

In some aspects, UE 120 may multiplex and scramble symbols. For example, UE 120 may multiplex spread modulated (and gained) symbols of processing layers 812-1 through 812-N, and may apply pseudo-random scrambling sequences, as described herein. In some aspects, UE 120 may apply tone mapping. For example, UE 120 may assign spread modulated symbols to adjacent tones for pre-DFT modulated symbol-level spreading. In this case, the spread modulated symbols may take the form $[s_1c_1{}^w, s_1c_2{}^w, s_1c_3{}^w, s_1c_4{}^w, s_2c_5{}^w, s_2c_6{}^w \ldots]$. Additionally, or alternatively, UE 120 may assign spread modulated symbols to non-adjacent tones for pre-DFT modulated symbol-level spreading. In this case, the spread modulated symbols may take the form $[s_1c_1{}^w, s_2c_2{}^w, s_3c_3{}^w, s_4c_4{}^w, s_5c_5{}^w, s_6c_6{}^w \ldots s_1c_k{}^w, s_2c_{k+1}{}^w, s_3c_{k+2}{}^w, s_4c_{k+3}{}^w, s_5c_{k+4}{}^w, s_6c_{k+5}{}^w \ldots]$.

Additionally, or alternatively, for OFDM symbol level spreading, UE 120 may disable scrambling, thereby preserving peak to average power ratio (PAPR). In this case, for a first DFT-s-OFDM symbol, symbols may take the form $[s_1c_1{}^w, s_2c_1{}^w, \ldots]$, for a second DFT-s-OFDM symbol, symbols may take the form $[s_1c_1{}', s_2c_1{}', \ldots]$, and for a third DFT-s-OFDM symbol, symbols may take the form $[s_1c_1{}'', s_2c_1{}'', \ldots]$. Additionally, or alternatively, UE 120 may introduce a different phase ramping for each OFDM symbol applied before applying an inverse fast-Fourier transform (IFFT) procedure. In this case, UE 120 may apply a first phase ramping $[e^{j\theta_1}, e^{j2\theta_1}, e^{j3\theta_1}, e^{j4\theta_1}]$ to each tone of the first DFT-s-OFDM symbol, a phase ramping $[e^{j\theta_2}, e^{j2\theta_2}, e^{j3\theta_2}, e^{j4\theta_2}]$ to each tone of the second DFT-s-OFDM symbol, and/or the like.

As further shown in FIG. 8, and by reference number 864, UE 120 may transmit the symbols. For example, UE 120 may transmit the symbols to BS 110 based at least in part on processing the symbols. In this case, BS 110 may receive and decode the symbols based at least in part on UE 120 preserving the particular modulation scheme. In this way, UE 120 enables use of a non-orthogonal multiple access scheme.

As indicated above, FIG. 8 is provided as an example. Other examples may differ from what is described with respect to FIG. 8.

Figure 9:
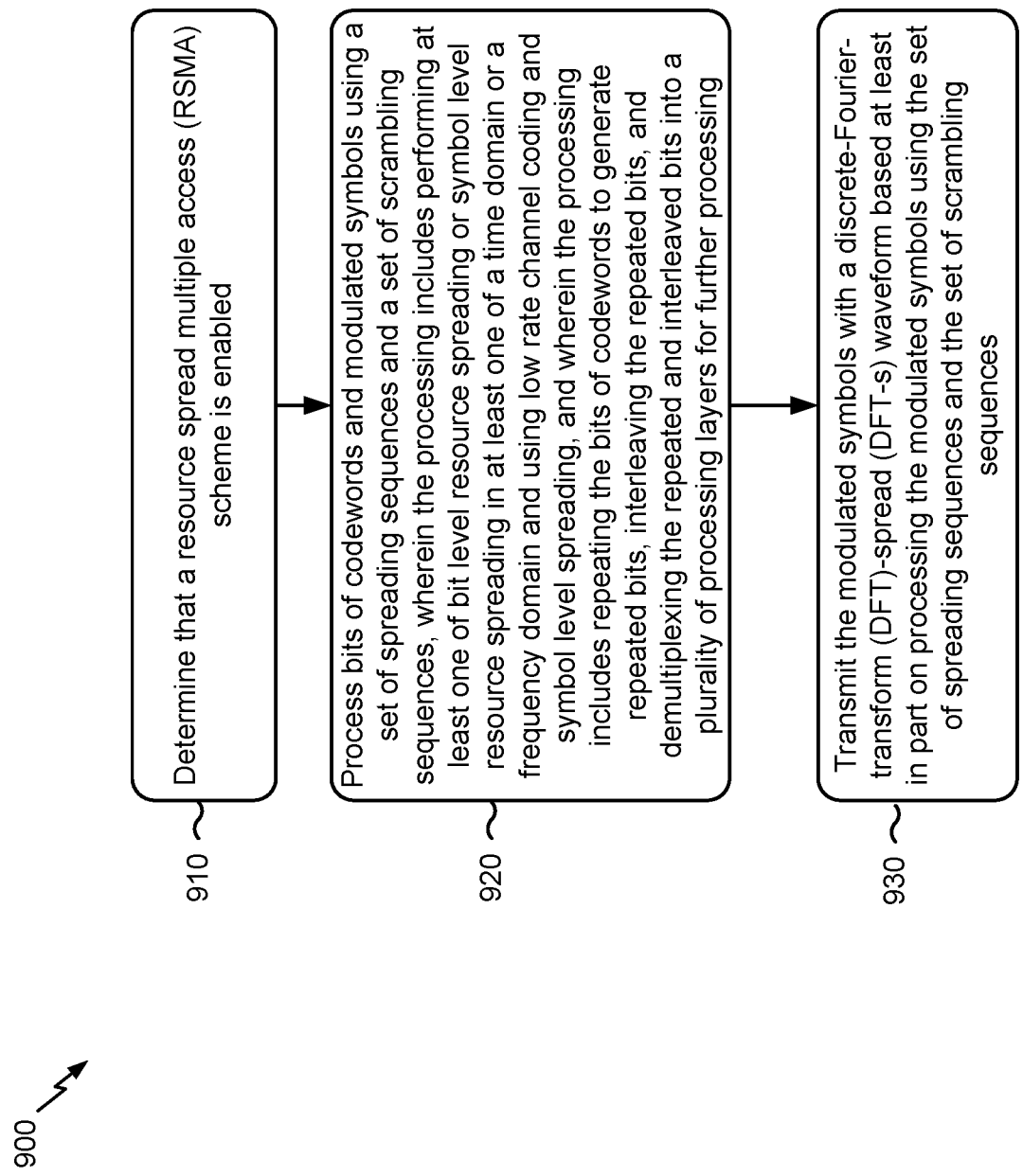
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with symbol processing.

As shown in FIG. 9, in some aspects, process 900 may include determining that a resource spread multiple access scheme is enabled (block 910). For example, the UE (e.g., using receive processor 258, transmit processor 264, controller/processor 280, memory 282, and/or the like) may determine that a resource spread multiple access scheme is enabled, as described above.

As further shown in FIG. 9, in some aspects, process 900 may include processing bits of codewords and modulated symbols using a set of spreading sequences and a set of scrambling sequences, wherein the processing includes performing at least one of bit level resource spreading or symbol level resource spreading in at least one of a time domain or a frequency domain and using low rate channel coding and symbol level spreading, and wherein the processing includes repeating the bits of codewords to generate repeated bits, interleaving the repeated bits, and demultiplexing the repeated and interleaved bits into a plurality of processing layers for further processing (block 920). For example, the UE (e.g., using receive processor 258, transmit processor 264, controller/processor 280, memory 282, and/or the like) may process bits of codewords and modulated symbols using a set of spreading sequences and a set of scrambling sequences and wherein the processing includes repeating the bits of codewords to generate repeated bits, interleaving the repeated bits, and demultiplexing the repeated and interleaved bits into a plurality of processing layers for further processing, as described above. In some aspects, the processing includes performing at least one of bit level resource spreading or symbol level resource spreading in at least one of a time domain or a frequency domain and using low rate channel coding and symbol level spreading. In some aspects, the processing includes repeating the bits of codewords to generate repeated bits, interleaving the repeated bits, and demultiplexing the repeated and interleaved bits into a plurality of processing layers for further processing.

As further shown in FIG. 9, in some aspects, process 900 may include transmitting the modulated symbols with a discrete-Fourier-transform (DFT)-spread (DFT-s) waveform based at least in part on processing the modulated symbols using the set of spreading sequences and the set of scrambling sequences (block 930). For example, the UE (e.g., using receive processor 258, transmit processor 264, controller/processor 280, memory 282, and/or the like) may transmit the modulated symbols with a discrete-Fourier-transform (DFT)-spread (DFT-s) waveform based at least in part on processing the modulated symbols using the set of spreading sequences and the set of scrambling sequences, as described above.

Process 900 may include additional aspects, such as any single implementation or any combination of aspects described below and/or in connection with one or more other processes described elsewhere herein.

In some aspects, the UE is configured to perform at least one of low rate channel coding or symbol-level short code spreading. In some aspects, the UE is configured to perform long sequence scrambling in addition to bit level resource spreading and symbol level resource spreading. In some aspects, the UE is configured to concurrently perform spreading using the plurality of processing layers. In some aspects, the processing is performed based at least in part on at least one of a spreading factor, a quantity of processing layers of the plurality of processing layers, or a modulation order.

In some aspects, the further processing includes layer-specific interleaving of a set of bits, of the repeated and interleaved bits and of a particular processing layer of the plurality of processing layers, after demultiplexing the repeated and interleaved bits into the plurality of processing layers. In some aspects, the layer-specific interleaving and the interleaving is performed using a repeated interleaving pattern. In some aspects, a same coded bit is repeated across the plurality of processing layers as an input for the layer-specific interleaving.

In some aspects, modulated symbols, of different processing layers of the plurality of processing layers, are interleaved based at least in part on the layer-specific interleaving. In some aspects, the layer-specific interleaving is performed based at least in part on a gain factor. In some aspects, the processing includes tone mapping.

In some aspects, the tone mapping includes pre-DFT modulated symbol level spreading. In some aspects, the tone mapping includes assigning spread modulated symbols to adjacent tones. In some aspects, the tone mapping includes assigning spread modulated symbols to non-adjacent tones.

In some aspects, the tone mapping includes orthogonal frequency division multiplexed symbol level spreading where spread modulated symbols are assigned to different DFT-s-orthogonal frequency division multiplexed (DFT-s-OFDM) symbols.

In some aspects, scrambling is disabled. In some aspects, the UE is configured to perform phase ramping using different phase ramping values for different DFT-s orthogonal frequency division multiplexed (DFT-s-OFDM) symbols and after the tone mapping.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a resource spread multiple access (RSMA) scheme is enabled;
    processing bits of codewords and modulated symbols using a set of spreading sequences and a set of scrambling sequences,
        wherein the processing includes performing at least one of bit level resource spreading or symbol level resource spreading in at least one of a time domain or a frequency domain and using channel coding and symbol level spreading, and
        wherein the processing includes repeating the bits of codewords to generate repeated bits, interleaving the repeated bits, and demultiplexing the repeated and interleaved bits into a plurality of processing layers for further processing; and
    transmitting the modulated symbols with a discrete-Fourier-transform (DFT)-spread (DFT-s) waveform based at least in part on processing the modulated symbols using the set of spreading sequences and the set of scrambling sequences.

2. The method of claim 1, wherein the UE is configured to perform at least one of the channel coding or symbol-level short code spreading.

3. The method of claim 1, wherein the UE is configured to perform sequence scrambling in addition to the bit level resource spreading and the symbol level resource spreading.

4. The method of claim 1, wherein the UE is configured to concurrently perform spreading on the plurality of processing layers.

5. The method of claim 1, wherein the processing is performed based at least in part on at least one of a spreading factor, a quantity of processing layers of the plurality of processing layers, or a modulation order.

6. The method of claim 1, wherein the processing further includes layer-specific interleaving of a set of bits, of the repeated and interleaved bits, and of a particular processing layer of the plurality of processing layers, after demultiplexing the repeated and interleaved bits into the plurality of processing layers.

7. The method of claim 6, wherein the layer-specific interleaving and the interleaving is performed using a repeated interleaving pattern.

8. The method of claim 6, wherein a same coded bit is repeated across the plurality of processing layers as an input for the layer-specific interleaving.

9. The method of claim 6, wherein the modulated symbols, of different processing layers of the plurality of processing layers, are interleaved based at least in part on the layer-specific interleaving.

10. The method of claim 6, wherein the layer-specific interleaving is performed based at least in part on a gain factor.

11. The method of claim 1, wherein the processing includes tone mapping.

12. The method of claim 11, wherein the tone mapping includes pre-DFT modulated symbol level spreading.

13. The method of claim 11, wherein the tone mapping includes assigning spread modulated symbols to adjacent tones.

14. The method of claim 11, wherein the tone mapping includes assigning spread modulated symbols to non-adjacent tones.

15. The method of claim 11, wherein the tone mapping includes orthogonal frequency division multiplexed symbol level spreading in which spread modulated symbols are assigned to different DFT-s-orthogonal frequency division multiplexed (DFT-s-OFDM) symbols.

16. The method of claim 11, wherein scrambling is disabled.

17. The method of claim 11, wherein the UE is configured to perform phase ramping using different phase ramping values for different DFT-s orthogonal frequency division multiplexed (DFT-s-OFDM) symbols and after the tone mapping.

18. A user equipment (UE) for wireless communication, comprising:
a memory; and
one or more processors coupled to the memory, the memory and the one or more processors configured to:
determine that a resource spread multiple access (RSMA) scheme is enabled;
process bits of codewords and modulated symbols using a set of spreading sequences and a set of scrambling sequences,
wherein the processing includes performing at least one of bit level resource spreading or symbol level resource spreading in at least one of a time domain or a frequency domain and using low rate channel coding and symbol level spreading, and
wherein the processing includes repeating the bits of codewords to generate repeated bits, interleaving the repeated bits, and
demultiplexing the repeated and interleaved bits into a plurality of processing layers for further processing; and
transmit the modulated symbols with a discrete-Fourier-transform (DFT)-spread (DFT-s) waveform based at least in part on processing the modulated symbols using the set of spreading sequences and the set of scrambling sequences.

19. The UE of claim 18, wherein the UE is configured to perform at least one of channel coding or symbol level short code spreading.

20. The UE of claim 18, wherein the UE is configured to perform sequence scrambling in addition to the bit level resource spreading and the symbol level resource spreading.

21. The UE of claim 18, wherein the UE is configured to concurrently perform spreading on the plurality of processing layers.

22. The UE of claim 18, wherein the processing is performed based at least in part on at least one of a spreading factor, a quantity of processing layers of the plurality of processing layers, or a modulation order.

23. The UE of claim 18, wherein the processing further includes layer-specific interleaving of a set of bits, of the repeated and interleaved bits and of a particular processing layer of the plurality of processing layers, after demultiplexing the repeated and interleaved bits into the plurality of processing layers.

24. The UE of claim 23, wherein the layer-specific interleaving and the interleaving is performed using a repeated interleaving pattern.

25. The UE of claim 23, wherein a same coded bit is repeated across the plurality of processing layers as an input for the layer-specific interleaving.

26. The UE of claim 23, wherein the modulated symbols, of different processing layers of the plurality of processing layers, are interleaved based at least in part on the layer-specific interleaving.

27. The UE of claim 23, wherein the layer-specific interleaving is performed based at least in part on a gain factor.

28. The UE of claim 18, wherein the processing includes tone mapping.

29. The UE of claim 28, wherein the tone mapping includes pre-DFT modulated symbol level spreading.

30. The UE of claim 28, wherein the tone mapping includes assigning spread modulated symbols to adjacent tones.

31. The UE of claim 28, wherein the tone mapping includes assigning spread modulated symbols to non-adjacent tones.

32. The UE of claim 28, wherein the tone mapping includes orthogonal frequency division multiplexed symbol level spreading where spread modulated symbols are assigned to different DFT-s-orthogonal frequency division multiplexed (DFT-s-OFDM) symbols.

33. The UE of claim 28, wherein scrambling is disabled.

34. The UE of claim 28, wherein the UE is configured to perform phase ramping using different phase ramping values for different DFT-s orthogonal frequency division multiplexed (DFT-s-OFDM) symbols and after the tone mapping.

35. A non-transitory computer-readable medium storing one or more instructions for wireless communication, the one or more instructions comprising:
one or more instructions that, when executed by one or more processors of a user equipment (UE), cause the one or more processors to:
determine that a resource spread multiple access (RSMA) scheme is enabled;
process bits of codewords and modulated symbols using a set of spreading sequences and a set of scrambling sequences,
wherein the processing includes performing at least one of bit level resource spreading or symbol level resource spreading in at least one of a time domain or a frequency domain and using low rate channel coding and symbol level spreading, and
wherein the processing includes repeating the bits of codewords to generate repeated bits, interleaving the repeated bits, and
demultiplexing the repeated and interleaved bits into a plurality of processing layers for further processing; and
transmit the modulated symbols with a discrete-Fourier-transform (DFT)-spread (DFT-s) waveform based at least in part on processing the modulated symbols using the set of spreading sequences and the set of scrambling sequences.

36. The non-transitory computer-readable medium of claim 35, wherein the UE is configured to perform at least one of channel coding or symbol-level spreading.

37. The non-transitory computer-readable medium of claim 35, wherein the UE is configured to perform sequence scrambling in addition to the bit level resource spreading and the symbol level resource spreading.

38. The non-transitory computer-readable medium of claim 35, wherein the UE is configured to concurrently perform spreading on the plurality of processing layers.

39. The non-transitory computer-readable medium of claim 35, wherein the processing is performed based at least in part on at least one of a spreading factor, a quantity of processing layers of the plurality of processing layers, or a modulation order.

40. The non-transitory computer-readable medium of claim 35, wherein the processing further includes layer-specific interleaving of a set of bits, of the repeated and interleaved bits and of a particular processing layer of the plurality of processing layers, after demultiplexing the repeated and interleaved bits into the plurality of processing layers.

41. The non-transitory computer-readable medium of claim 40, wherein the layer-specific interleaving and the interleaving is performed using a repeated interleaving pattern.

42. The non-transitory computer-readable medium of claim 40, wherein a same coded bit is repeated across the plurality of processing layers as an input for the layer-specific interleaving.

43. An apparatus for wireless communication, comprising:
 means for determining that a resource spread multiple access (RSMA) scheme is enabled;
 means for processing bits of codewords and modulated symbols using a set of spreading sequences and a set of scrambling sequences,
  wherein the processing includes performing at least one of bit level resource spreading or symbol level resource spreading in at least one of a time domain or a frequency domain and using low rate channel coding and symbol level spreading, and
  wherein the processing includes repeating the bits of codewords to generate repeated bits, interleaving the repeated bits, and demultiplexing the repeated and interleaved bits into a plurality of processing layers for further processing; and
 means for transmitting the modulated symbols with a discrete-Fourier-transform (DFT)-spread (DFT-s) waveform based at least in part on processing the modulated symbols using the set of spreading sequences and the set of scrambling sequences.

44. The apparatus of claim 43, wherein the UE is configured to perform at least one of channel coding or symbol-level spreading.

45. The apparatus of claim 43, wherein the UE is configured to perform sequence scrambling in addition to the bit level resource spreading and the symbol level resource spreading.

46. The apparatus of claim 43, wherein the UE is configured to concurrently perform spreading on the plurality of processing layers.

47. The apparatus of claim 43, wherein the processing is performed based at least in part on at least one of a spreading factor, a quantity of processing layers of the plurality of processing layers, or a modulation order.

48. The apparatus of claim 43, wherein the further processing includes layer-specific interleaving of a set of bits, of the repeated and interleaved bits and of a particular processing layer of the plurality of processing layers, after demultiplexing the repeated and interleaved bits into the plurality of processing layers.

49. The apparatus of claim 48, wherein the layer-specific interleaving and the interleaving is performed using a repeated interleaving pattern.

50. The apparatus of claim 48, wherein a same coded bit is repeated across the plurality of processing layers as an input for the layer-specific interleaving.

* * * * *